Oct. 15, 1935.  P. S. MORGAN  2,017,350
PUMP FITTING
Filed June 14, 1934
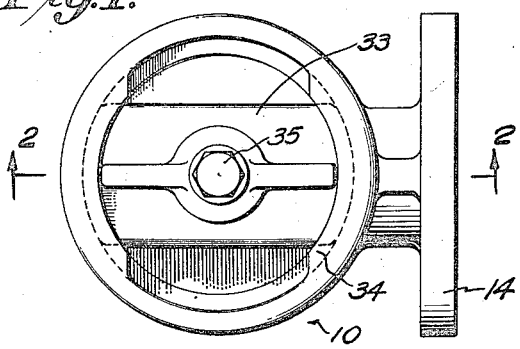
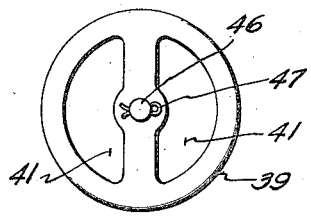
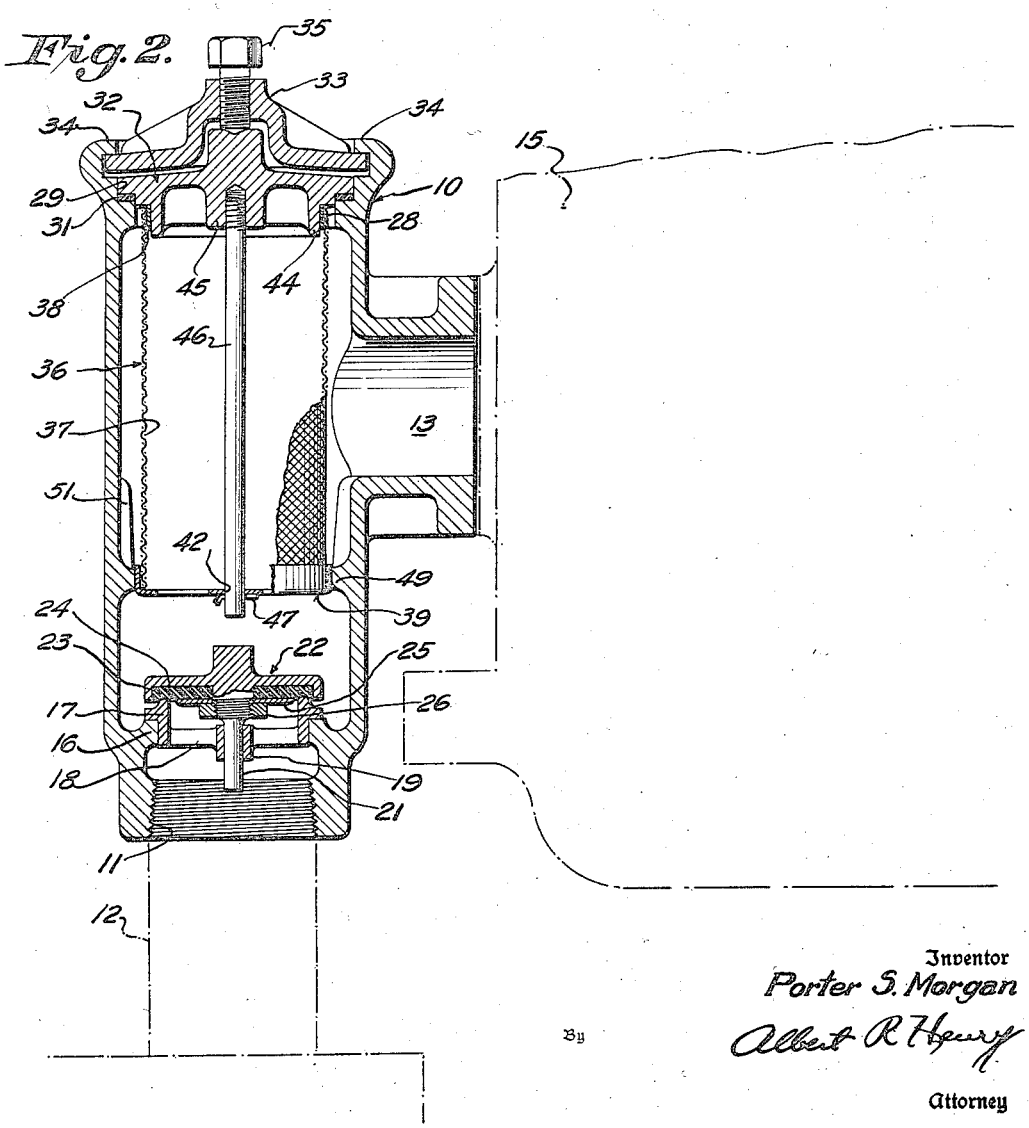
Inventor
Porter S. Morgan
By Albert R. Henry
Attorney Patented Oct. 15, 1935

2,017,350

UNITED STATES PATENT OFFICE 2,017,350

PUMP FITTING

Porter S. Morgan, New York, N. Y., assignor to
Liberty Share Corporation, Buffalo, N. Y.

Application June 14, 1934, Serial No. 730,595

2 Claims. (Cl. 210—166)

The invention relates to fittings for use in liquid systems.

The invention is directed to a fitting device containing a foot valve and a strainer structure which are organized in a manner permitting cooperation therebetween when in normal use and their removal from the device by a simple operation when cleaning or replacement is necessary.

The structural details of the device are more specifically described and shown in the accompanying specification and drawing, wherein:

Fig. 1 is a plan of the device;

Fig. 2 is a vertical section on the line 2—2 of Fig. 1; and

Fig. 3 is a bottom view of the strainer.

The device includes a housing 10, which is generally cylindrical in form and provided at its lower extremity with a tapped input opening 11 for receiving a pipe 12 which communicates with a liquid source, such as a tank or reservoir. Liquid is discharged from the housing through a radial passage 13 formed therein and provided with a flange 14, which serves as a means for connecting the housing to a pump 15 or other suction source.

Immediately adjacent the opening 11, the housing is formed with a circular shoulder portion 16, into which a seat 17 is pressed.

The seat is formed with a spider structure 18 having a central axial bearing 19 for receiving slidably the stem 21 of a valve 22. The valve is of the disc type having an annular groove 23 in its face for receiving a seating disc 24 of relatively soft material which is adapted to engage the seat 17. The disc 24 is retained in the groove 23 by a washer 25 which is pressed against the disc by a nut 26 engaged on a threaded portion of the stem 21.

The upper end of the housing contains an opening 28, which is shouldered, as indicated by the numeral 29, to receive a gasket 31 and a superimposed closure or head 32. Means are provided for retaining the head in sealing engagement with the housing, comprising a yoke 33 engaged under arcuate lugs 34 on the housing 10 and formed with a central tapped hole for receiving a screw 35. The screw 35 may be operated to apply sealing pressure to the underlying head 32, or, if access to the interior of the housing is desired, the screw may be loosened and the yoke turned and disengaged from the lugs 34, whereupon the head may be lifted from the housing.

Liquid entering the housing 10 is directed through a strainer 36 before emerging through the outlet passage 13. The strainer is formed of a cylindrical body 37 of fine mesh screening, reinforced at its upper extremity by a ring 38, and at its lower extremity by a flanged cup 39 containing openings 41 through which liquid is directed to the interior of the strainer. The cup 39 is also formed with a central hole 42 which serves as a securing means, as hereinafter described.

The head 32 is advantageously utilized as a mounting means for the strainer, and it is formed with a depending circular flange 44 on which the strainer ring 38 is lightly pressed, and it is also formed with a central hub 45 containing a tapped hole for receiving the threaded end of a rod 46. The rod extends axially in the housing and it is engaged through the hole 42 of the strainer cup 39, where it receives a cotter pin 47, which engages the cup and thus retains the strainer in assembled relation with the head 32.

The housing is formed with an internal circular flange 49 which slidably receives the peripheral portion of the strainer cup 39, so that all of the liquid may be directed through the strainer openings 41 and thence through the strainer to the discharge passage 13. Axial ribs 51 are formed in the housing adjacent the flange 49 and they serve to guide the cup 39 during assembly so that it may be located properly within the flange 49.

It will be noted that the diameter of the strainer is less than that of the inner wall of the housing, so that, in effect, the space therebetween provides a concentric discharge chamber leading into the discharge passage 13.

In operation, when suction pressures are present in the passage 13, as occasioned by the operation of a pump or the like, the valve 22 is lifted from its seat 17 until it strikes the overlying strainer rod 46, which thus serves as a stop member for the valve. Liquid is then drawn through the valve seat, strainer, and discharge passage 13, as previously described. When the pump ceases operation, the valve is immediately seated by the suction head in the pipe 12. The valve, thus seated, prevents a reverse liquid flow from the pump and housing, and it also retains the liquid column in the pipe 12, wherein, upon resumption of operation of the pump, a liquid supply is immediately available and priming of the pump is not required.

It will be apparent that upon clogging of the strainer, the head may be removed and the strainer detached therefrom for cleaning and replacement. Similarly, if the valve should fail during service, it may be easily removed from the housing through the open end of the housing.

The device, as above described, has been advantageously utilized as an input fitting on the gasoline pump shown in my copending application Serial No. 622,902, where it provided both a foot valve and an input strainer. It will be obvious, however, that it may be used in various liquid circuits in numerous manners.

I claim:

1. A fitting comprising a housing having an open cylindrical chamber formed at one extremity with means for attachment to a liquid conduit, an annular valve seat within the housing adjacent said extremity, a valve on said seat closing toward said extremity, guide means for retaining said valve in concentricity with the seat, a head removably secured to the opposite extremity of the chamber, a rod secured to the head and extending axially in the chamber to a position spaced from said valve to provide a stop therefor, a cylindrical strainer having one end mounted on said head, a perforate cup secured to the opposite end of the strainer and secured to said rod, said housing chamber being formed with a portion receiving said cup, whereby liquid entering the housing through the valve seat is directed through the cup to the interior of the strainer, and a discharge passage formed in the side wall of the housing adjacent said strainer.

2. A fitting comprising a housing having an open cylindrical chamber formed at one extremity with means for attachment to a liquid conduit, an annular valve seat within the housing adjacent said extremity and formed with a central axial bearing, a valve insertable through the remaining extremity of the housing and formed with a stem slidably received in said bearing, a head removably secured to said remaining extremity of the housing, a rod secured to the head and extending axially in the chamber to a position spaced from said valve to provide a stop therefor, a discharge passage formed in the side wall of the housing, a strainer in the housing interposed between said valve seat and said discharge passage, and means removably securing said strainer to said rod.

PORTER S. MORGAN.